US012596353B2

(12) United States Patent
Platenius-Mohr et al.

(10) Patent No.: US 12,596,353 B2
(45) Date of Patent: Apr. 7, 2026

(54) INDUSTRIAL FIELD DEVICE MONITORING SYSTEM

(71) Applicant: ABB Schweiz AG, Baden (CH)

(72) Inventors: Marie Christin Platenius-Mohr, Hirschberg an der Bergstraße (DE); Sten Gruener, Laudenbach (DE); Anders Trosten, Västerås (SE)

(73) Assignee: ABB Schweiz AG, Baden (CH)

( * ) Notice: Subject to any disclaimer, the term of this patent is extended or adjusted under 35 U.S.C. 154(b) by 414 days.

(21) Appl. No.: 18/322,026

(22) Filed: May 23, 2023

(65) Prior Publication Data

US 2023/0376011 A1 Nov. 23, 2023

(30) Foreign Application Priority Data

May 23, 2022 (EP) ..................................... 22174938

(51) Int. Cl.
*G05B 19/418* (2006.01)
(52) U.S. Cl.
CPC .................. *G05B 19/41835* (2013.01); *G05B 2219/31449* (2013.01)
(58) Field of Classification Search
CPC ................. G05B 19/41835; G05B 2219/31449
(Continued)

(56) References Cited

U.S. PATENT DOCUMENTS 8,988,998 B2 * 3/2015 Adam ................. G06F 11/3495
370/235
9,965,562 B2 * 5/2018 Lawson .................. H04L 67/12
(Continued)

FOREIGN PATENT DOCUMENTS

CN 105099739 B 8/2018
CN 110489132 A 11/2019
(Continued)

OTHER PUBLICATIONS

Hong, Cheol-Ho, and Blesson Varghese. "Resource management in fog/edge computing: a survey on architectures, infrastructure, and algorithms." ACM computing surveys (csur) 52.5 (2019): pp. 1-37. (Year: 2019).*
(Continued)

*Primary Examiner* — Satish Rampuria
(74) *Attorney, Agent, or Firm* — Fitch Even Tabin & Flannery LLP

(57) ABSTRACT

A system and method includes downloading an asset specification of a field device to an edge device, the field device configured to generate data relating to an asset of an industrial environment, the edge device located in the industrial environment, wherein the edge device is configured to receive the data generated by the field device; receiving an asset monitoring sub model for the field device, wherein the asset monitoring sub model specifies an interface specification and algorithm of an asset monitoring application for the field device; deploying the asset monitoring application for the field device to the edge device, wherein the deployment comprises utilization of the asset monitoring sub model; and generating a workflow function exposed by the asset monitoring application, wherein the generation of the workflow function comprises utilization of the asset specification of the field device and the interface specification of the asset monitoring sub model.

12 Claims, 3 Drawing Sheets

(58) Field of Classification Search
USPC ......................................................... 717/177
See application file for complete search history.

(56) References Cited

U.S. PATENT DOCUMENTS

| | | | | |
|---|---|---|---|---|
| 10,338,904 | B2 | 7/2019 | Desire | |
| 11,132,226 | B2* | 9/2021 | Jadhav | G06F 9/5077 |
| 11,886,576 | B2* | 1/2024 | Mehrotra | G06F 21/6227 |
| 12,033,006 | B1* | 7/2024 | Nair | G06F 8/61 |
| 2017/0285623 | A1* | 10/2017 | Figoli | H04L 67/12 |
| 2019/0098035 | A1* | 3/2019 | Periaswamy | G05B 19/0428 |
| 2019/0384749 | A1 | 12/2019 | Mowatt et al. | |
| 2020/0333770 | A1 | 10/2020 | Schulz et al. | |
| 2022/0100182 | A1* | 3/2022 | Mehrotra | G06F 21/57 |

FOREIGN PATENT DOCUMENTS

| | | | |
|---|---|---|---|
| EP | 2550595 | B1 | 11/2016 |
| EP | 3246779 | A1 | 11/2017 |
| EP | 3887912 | A1 | 10/2021 |
| WO | WO 2020/109987 | A1 | 6/2020 |

OTHER PUBLICATIONS

Dai, Wenbin, et al. "Industrial edge computing: Enabling embedded intelligence." IEEE Industrial Electronics Magazine 13.4 (2019): pp. 48-56. (Year: 2019).*
Jiang, Congfeng, et al. "An edge computing platform for intelligent operational monitoring in internet data centers." IEEE Access 7 (2019): pp. 133375-133387. (Year: 2019).*
Sun, Xiang, and Nirwan Ansari. "EdgeIoT: Mobile edge computing for the Internet of Things." IEEE Communications Magazine 54.12 (2016): 22-29. (Year: 2016).*
Mavromatis, Alex, et al. "A software-defined IoT device management framework for edge and cloud computing." IEEE Internet of Things Journal 7.3 (2019): 1718-1735. (Year: 2019).*
Sabella, Dario, et al. "Developing software for multi-access edge computing." ETSI white paper 20.2019 (2019): 1-38. (Year: 2019).*
Khan et al., "On Edge Cloud Service Provision with Distributed Home Servers," *2017 IEEE International Conference on Cloud Computing Technology and Science (CloudCom)*, 4 pp. (Dec. 11-14, 2017).
European Patent Office, Extended European Search Report in European Patent Application No. 22174938.5, 10 pp. (Nov. 21, 2022).

* cited by examiner

Transfer maintenance result (or other device data)

Select submodels
to be created

Use asset spec
server to transform
internal edge data to
standardized
asset spec Exchange asset
submodels with
third party

INDUSTRIAL FIELD DEVICE MONITORING SYSTEM

CROSS-REFERENCE TO RELATED APPLICATIONS

This patent application claims priority to European Patent Application No. 22174938.5, filed on May 23, 2022, which is incorporated herein in its entirety by reference.

FIELD OF THE DISCLOSURE

The present disclosure generally relates to industrial field device monitoring systems and methods.

BACKGROUND OF THE INVENTION

A mid-sized industrial plant needs to manage thousands of devices (field devices) producing lots of data. As some of this data needs to be processed fast, latency becomes a challenge. Thus, data processing is moved to computing nodes, so-called edge devices, that are placed on-premise, close to the devices generating the data. Edge device can range from for example an embedded PC to a data center that is operated on the premises. Advantages of edge computing in addition to low latency and high bandwidth are, amongst others, improved availability and ease of managing privacy and security as confidential data can be kept on the plant. This opens the door for the deployment of device/asset monitoring applications, e.g., for predictive maintenance, on edge devices. Such applications may follow simple rule-based approaches but can also be more advanced and involve complex models, e.g., pre-trained machine-learning and artificial intelligence (AI) models.

In asset monitoring scenarios, there are usually multiple parties involved: different device providers, the automation system provider, and the plant owners/operators. The device providers know best how to monitor the provided devices, but the monitoring itself is done on the plant (industrial environment) where the device instance operates as part of a specific process. Thus, there needs to be a possibility to deploy a third-party asset monitoring algorithm to the edge device and use it as part of a configurable asset monitoring workflow. Such an asset monitoring workflow across company borders is, on one hand, complicated by different parties using different formats for specifying the involved assets, input data, and the computed monitoring results. On the other hand, the exchanged monitoring algorithm and its interfaces are not necessarily easy to integrate by different parties. This even holds if the monitoring algorithm is provided in-house as interfaces can be increasingly complex when dealing with different kinds of devices to be monitored. All this leads to expensive manual work that takes multiple days and results in an inflexible, error-prone integration that is difficult to be adapted and to be reused. Moreover, these tasks need to involve expert knowledge in software integration that the usual process engineers on a plant do not have.

BRIEF SUMMARY OF THE INVENTION

In a general aspect, the present disclosure describes an improved technique for the deployment of asset monitoring algorithms in edge computing environments. Such asset monitoring algorithms can be those developed by users or operators themselves, or algorithms provided by third parties.

Regarding the solution, there are specifications providing a structured asset specification for any physical or virtual asset, which consist of so-called sub models covering different aspects of the asset's lifecycle, like technical information, documentation or nameplate information.

In an aspect, there is provided an industrial field device monitoring system, wherein the system is configured to: download an asset specification of a field device to an edge device, wherein the field device is located in an industrial environment, wherein the field device is configured to generate data relating to an asset of the industrial environment, wherein the edge device is located in the industrial environment, and wherein the edge device is configured to receive the data generated by the field device; receive an asset monitoring sub model for the field device, wherein the asset monitoring sub model specifies an interface specification and algorithm of an asset monitoring application for the field device; deploy the asset monitoring application for the field device to the edge device, wherein the deployment comprises utilization of the asset monitoring sub model; and generate a workflow function exposed by the asset monitoring application, wherein the generation of the workflow function comprises utilization of the asset specification of the field device and the interface specification of the asset monitoring sub model.

BRIEF DESCRIPTION OF THE SEVERAL VIEWS OF THE DRAWING(S)

DETAILED DESCRIPTION OF THE INVENTION

Figure 1:
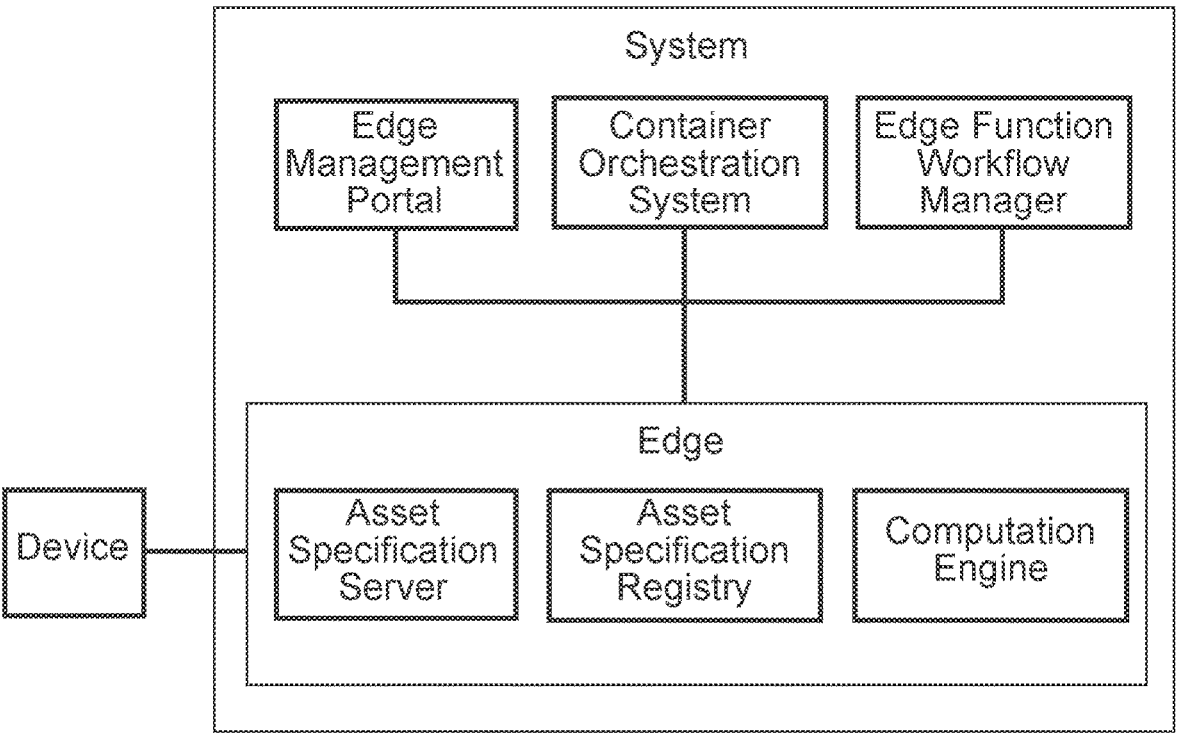
FIG. 1 is a block diagram of a detailed architecture of an exemplar industrial field device monitoring system in accordance with the disclosure.
Figure 2:
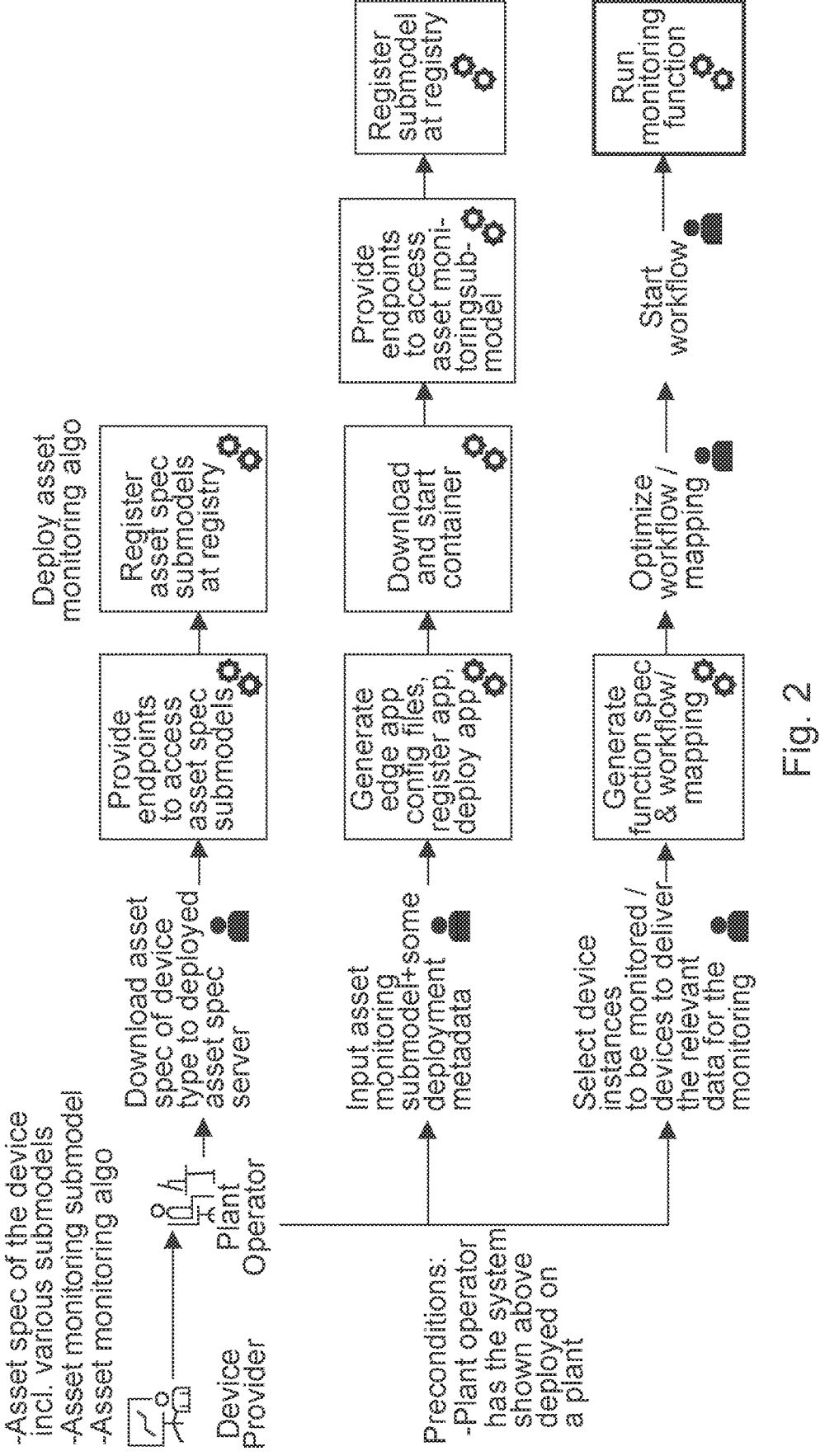
FIG. 2 is a block diagram of a detailed example of an industrial field device monitoring system in accordance with the disclosure.
Figure 3:
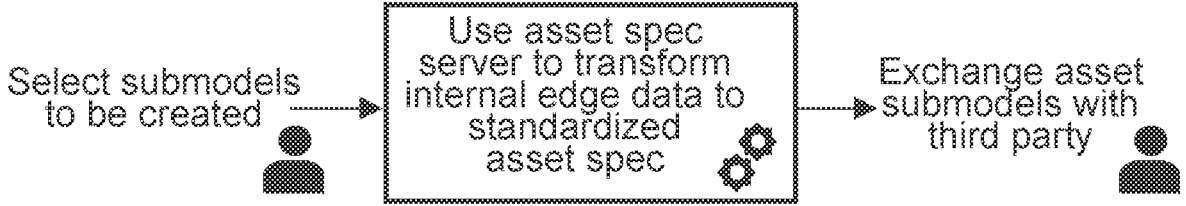
FIG. 3 is a block diagram of an example of result transfer in accordance with the disclosure.

FIGS. 1-3 relate to industrial field device monitoring systems and methods.

An exemplar industrial field device monitoring system is configured to: download an asset specification of a field device to an edge device, wherein the field device is located in an industrial environment, wherein the field device is configured to generate data relating to an asset of the industrial environment, wherein the edge device is located in the industrial environment, and wherein the edge device is configured to receive the data generated by the field device; receive an asset monitoring sub model for the field device, wherein the asset monitoring sub model specifies an interface specification and algorithm of an asset monitoring application for the field device; deploy the asset monitoring application for the field device to the edge device, wherein the deployment comprises utilization of the asset monitoring sub model; and generate a workflow function exposed by the asset monitoring application, wherein the generation of the workflow function comprises utilization of the asset specification of the field device and the interface specification of the asset monitoring sub model.

In an example, the system is operating in a cloud computing environment, or it may be operating on one or more on-premise servers, on one or more off-premise servers, and the like. According to an example, the system is configured to provide the asset monitoring sub model to a generator to generate a configuration file to register the asset monitoring application at the edge device. According to an example, the system is configured to generate endpoints to access contents of the asset monitoring sub model. The endpoints comprise endpoints from the deployed asset monitoring application. According to an example, the generation of the workflow function comprises utilization of the endpoints from the deployed asset monitoring application. According to an example, the system is configured to register the asset monitoring sub model at the edge device. According to an example, the asset specification of the field device comprises device individual information for the field device. The generation of the workflow function can then comprise utilization of the device individual information for the field device. According to an example, the system is configured to register the asset specification of the field device at the edge device. In an example, the workflow function maps field device signals of the data generated by the field device to a function signature.

An exemplar industrial field device monitoring system comprises an edge device, and the system is configured to: download an asset specification of a field device to the edge device, wherein the field device is located in an industrial environment, wherein the field device is configured to generate data relating to an asset of the industrial environment, wherein the edge device is located in the industrial environment, and wherein the edge device is configured to receive the data generated by the field device; receive an asset monitoring sub model for the field device, wherein the asset monitoring sub model specifies an interface specification and algorithm of an asset monitoring application for the field device; deploy the asset monitoring application for the field device to the edge device, wherein the deployment comprises utilization of the asset monitoring sub model; generate a workflow function exposed by the asset monitoring application, wherein the generation of the workflow function comprises utilization of the asset specification of the field device and the interface specification of the asset monitoring sub model; and invoke by the edge device the workflow function exposed by the asset monitoring application with the data received from the field device.

In exemplary embodiments, parts of the system other than the edge device can be operating in a cloud computing environment, parts of the system other than the edge device can be operating on one or more on-premise servers, or parts of the system other than the edge device can be operating on one or more off-premise servers.

In an example, the edge device can continuously invoke the workflow function exposed by the asset monitoring application with the data received from the field device. In an example, the system is configured to provide the asset monitoring sub model to a generator to generate a configuration file to register the asset monitoring application at the edge device. In an example, the system is configured to generate endpoints to access contents of the asset monitoring sub model. The endpoints comprise endpoints from the deployed asset monitoring application. In an example, the generation of the workflow function comprises utilization of the endpoints from the deployed asset monitoring application. According to an example, the system is configured to register the asset monitoring sub model at the edge device. In an example, the asset specification of the field device comprises device individual information for the field device. The generation of the workflow function can then comprise utilization of the device individual information for the field device. According to an example, the system is configured to register the asset specification of the field device at the edge device. In an example, the workflow function maps field device signals of the data generated by the field device to a function signature. According to an example, the asset specification of the field device comprises one or more asset specification sub models. The system is configured to generate a new asset specification sub model based on the information downloaded, deployed and/or registered to the edge device.

An exemplar industrial field device monitoring method comprises: downloading an asset specification of a field device to an edge device, wherein the field device is located in an industrial environment, wherein the field device is configured to generate data relating to an asset of the industrial environment, wherein the edge device is located in the industrial environment, and wherein the edge device is configured to receive the data generated by the field device; receiving an asset monitoring sub model for the field device, wherein the asset monitoring sub model specifies an interface specification and algorithm of an asset monitoring application for the field device; deploying the asset monitoring application for the field device to the edge device, wherein the deployment comprises utilizing the asset monitoring sub model; and generating a workflow function exposed by the asset monitoring application, wherein generating the workflow function comprises utilizing the asset specification of the field device and the interface specification of the asset monitoring sub model.

It is to be noted that the downloading the asset specification of a field device to an edge device and receiving the asset monitoring sub model can occur in two steps or can occur in one step. For example, a monitoring sub model can be embedded into the download of the asset specification/field device specification.

In an example, the method comprises providing the asset monitoring sub model to a generator to generate a configuration file to register the asset monitoring application at the edge device. In an example, the method comprises generating endpoints to access contents of the asset monitoring sub model, and the endpoints comprise endpoints from the deployed asset monitoring application. In an example, the generating the workflow function comprises utilizing the endpoints from the deployed asset monitoring application. In an example, the method comprises registering the asset monitoring sub model at the edge device. In an example, the asset specification of the field device comprises device individual information for the field device. The generating the workflow function can then comprise utilizing the device individual information for the field device. In an example, the method comprises registering the asset specification of the field device at the edge device. In an example, the workflow function maps field device signals of the data generated by the field device to a function signature.

An exemplar industrial field device monitoring method comprises: downloading an asset specification of a field device to an edge device, wherein the field device is located in an industrial environment, wherein the field device generates data relating to an asset of the industrial environment, wherein the edge device is located in the industrial environment, and wherein the edge device receives the data generated by the field device; receiving an asset monitoring sub model for the field device, wherein the asset monitoring sub model specifies an interface specification and algorithm of an asset monitoring application for the field device; deploying the asset monitoring application for the field device to the edge device, wherein the deployment comprises utilizing the asset monitoring sub model; generating a workflow function exposed by the asset monitoring application, wherein the generating the workflow function comprises utilizing the asset specification of the field device and the interface specification of the asset monitoring sub model; and invoking by the edge device the workflow function exposed by the asset monitoring application with the data received from the field device.

It is to be noted that the downloading the asset specification of a field device to an edge device and receiving the asset monitoring sub model can occur in two steps or can occur in one step. For example, a monitoring sub model can be embedded into the download of the asset specification/ field device specification.

In an example, the method comprises continuously invoking by the edge device the workflow function exposed by the asset monitoring application with the data received from the field device.

In an example, the method comprises providing the asset monitoring sub model to a generator to generate a configuration file to register the asset monitoring application at the edge device.

In an example, the method comprises generating endpoints to access contents of the asset monitoring sub model, and the endpoints comprise endpoints from the deployed asset monitoring application.

In an example, the generating the workflow function comprises utilizing the endpoints from the deployed asset monitoring application.

In an example, the method comprises registering the asset monitoring sub model at the edge device.

In an example, the asset specification of the field device comprises device individual information for the field device. The generating the workflow function can then comprise utilizing the device individual information for the field device.

In an example, the method comprises registering the asset specification of the field device at the edge device.

In an example, the workflow function maps field device signals of the data generated by the field device to a function signature.

In an example, the asset specification of the field device comprises one or more asset specification sub models. The method can then comprise generating a new asset specification sub model based on the information downloaded, deployed and/or registered to the edge device.

Thus, systems and methods for deployment and integration of asset monitoring applications based on standardized asset specifications have been developed.

The ability to deploy asset monitoring algorithms to an industrial plant in the new manner provides improved quality in predicting device health. An asset monitoring workflow across company borders is complicated due to different parties using different formats for specifying the involved assets, input data, and monitoring results. Also, the exchanged monitoring algorithm and its interfaces are not easy to integrate by different parties. This leads to expensive, time-taking, and error-prone manual work. This has been addressed in the new systems and methods described here, that provide methods and systems to support integrating and deploying third-party monitoring algorithms on the plant. The systems and methods combine standardized asset specifications, an edge ecosystem with applications running on edge devices, functions and container orchestration systems. Thereby, this approach implements a collaborative asset monitoring scenario with information exchange across company borders. The major benefits are minimized time, effort, and skills needed for deployment of third-party asset monitoring applications on an industrial plant.

Continuing with the figures, the industrial field device monitoring systems and methods are described in further detail, with respect to specific embodiments.

The system (see FIG. 1 that shows a system architecture) contains an Edge device, and additional services deployed in the cloud: An Edge Management Portal to manage edge devices and their applications, a Container Orchestration System to manage the containers running the implementations of the edge applications, and an Edge Function Workflow Manager to specify workflows composed from runnable functions invoked from the applications.

The edge device is connected to the devices to be monitored. The devices to be monitored can also be termed field devices. The edge device contains an Asset Specification Server to provide access to the contents of asset specifications on the edge, an Asset Specification Registry to locate the asset specifications, and a Computation Engine to schedule the actual functions running on the edge and accessing the asset specifications.

An example of the system does not need to include the edge device.

The method for deploying and integration asset monitoring applications consists of four main phases (see FIG. 2 that shows steps of the method for deploying and integration third-party asset monitoring applications). It is executed as follows:

Preliminary steps: Following Industry 4.0 principles, along with the device, the device provider provides the asset specification of the device to the plant operator. An asset specification provides information on an asset and operations to interact with it in a standardized way. The asset specification is structured by aspects (e.g., lifecycle phases) in various sub models. In addition, the device provider provides an asset monitoring algorithm tailored to the provided device or its type in the form of a software container. The interface and metadata of that algorithm is specified in an asset monitoring sub model that the device provider provides to be added to the standardized asset specification.

Furthermore, the plant operator has the device to be monitored connected to an edge device to collect the data and to serve as a platform to deploy software components accessing this data. This data can contain device parameters or its operational values.

Installation of the asset specification on the edge: The plant operator uses the Edge Management Portal and the Asset Specification Server to download the asset specification of the device received from the device provider to the edge device. The Asset Specification Server takes care of providing endpoints to access the contents of the asset specification sub models and registers them at the Asset Specification Registry.

Integration of third-party application: The plant operator feeds the asset monitoring sub model received from the device provider to the Edge Management Portal, which uses a generator to generate configuration files to register the asset monitoring application in the portal and to deploy it via the Container Orchestration System to the edge device (since the monitoring application is packaged as a software container). There, it will provide endpoints to access the contents of the asset monitoring sub model and register it at the Asset Specification Registry. The asset monitoring application is specific to the device type. Its functions can be invoked for multiple device instances (see deployment of monitoring function).

Deployment of monitoring function: The edge's Computation Engine is required to be able to invoke the function exposed by the asset monitoring application with the data streamed in from device instances (the device instance to be monitored or also further devices delivering relevant data to assess the condition of the device to be monitored) as input parameters. Thus, the plant operator provides the system with the relevant device instance IDs. In addition to these IDs, the system takes the function's interface specification from the asset monitoring sub model as well as the endpoints from the deployed asset monitoring application, to generate a function workflow. As part of this workflow, the device signals are mapped to the asset monitoring function signature. The system can recommend such a mapping based on data types and semantic IDs, but it may be corrected or completed or refined by the process engineer in the next step. Afterwards, the function workflow can be started.

As the asset monitoring algorithm/function may access the asset specification (which may partially reference parts deployed on different systems and organizations), it has access to device data usually not being available on the edge, e.g., specific monitoring parameters, knowledge from other lifecycle phases stemming from other parties, like maintenance staff, or other kinds of context information.

The monitoring results calculated by the asset monitoring function can be provided to a third party (e.g., back to the device provider). For this purpose, the asset specification server can be used to transform the internal representation of the information on the edge into a sub model the standardized asset specification (see FIG. 3).

The asset specifications' modularity enables the operator to select only specific sub models to be created, i.e., he can control which data will become part of the standardized asset specification to leave the plant and which not. The exchange of the asset sub models with another party can be managed either by file transfer or by allowing secured and party-specific live access to the asset specification server on the edge device (e.g., using role-based access control).

Thus, the new industrial field device monitoring systems and methods provide a method and system to support the process engineer in integrating and deploying monitoring algorithms on the edge devices installed on the plant. The system expects the properties of the monitored asset to be specified in an interoperable format and the monitoring algorithm to be available as a software-container with an invokable interface that is specified as part of the asset specification.

The system integrates standardized asset specification infrastructure into an edge ecosystem to deploy and run applications and functions on edge devices. It combines standardized asset specifications with edge applications, functions and software container orchestration systems for the purpose of integrating third-party and other monitoring applications. Thereby, it implements a collaborative asset monitoring scenario with information exchange across company borders. In addition, it provides a platform for asset monitoring applications incorporating information from multiple lifecycle phases and additional context information.

The method uses the system to turn a standardized asset specification and the monitoring algorithm provided by a third party into a runnable function and to deploy and run it on an edge device, accessing information from the asset specification and returning the results in an interoperable format.

The major benefits are minimized time, effort, and skills needed for deployment of asset monitoring applications on the edge device. At the same time, asset monitoring applications are enabled to make use of additional asset information, which increases the prediction quality and thereby the reliable operation of the devices and, hence, the plant.

Thus, in summary the new technology relates to: Combination of standardized asset specifications with edge device applications, functions and software container orchestration systems for the purpose of integrating third-party monitoring applications; Integration of asset specification infrastructure into an edge ecosystem; Implementation of a collaborative asset monitoring scenario with information exchange across company borders; Platform for asset monitoring applications incorporating information from multiple lifecycle phases and additional context information.

The new technology provides for: Less time, effort, and skills needed for deployment of third-party asset monitoring applications on the edge device; Less manual error-prone work due to semi-automated integration; Enabled access for asset monitoring applications to additional asset information, thereby increased prediction quality and improved device health.

In another exemplary embodiment, a computer program or computer program element is provided that is characterized by being configured to execute the method steps of the method according to one of the preceding embodiments, on an appropriate processor or system.

The computer program element might therefore be stored on a computer unit, which might also be part of an embodiment. This computing unit may be configured to perform or induce performing of the steps of the method described above. Moreover, it may be configured to operate the components of the above described system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

General exemplary embodiments will be discussed hereinafter. Accordingly, in an example, the system is operating in a cloud computing environment. In an example, the system is operating on one or more on-premise servers. In an example, the system is operating on one or more off-premise servers. Thus, the system can be on-premise or off-premise or "in the cloud". In an example, the system is configured to provide the asset monitoring sub model to a generator to generate a configuration file to register the asset monitoring application at the edge device. In an example, the system is configured to generate endpoints to access contents of the asset monitoring sub model, and wherein the endpoints comprise endpoints from the deployed asset monitoring application.

In an example, the generation of the workflow function comprises utilization of the endpoints from the deployed asset monitoring application. In an example, the system is configured to register the asset monitoring sub model at the edge device. In an example, the asset specification of the field device comprises device individual information for the field device. The generation of the workflow function can then comprise utilization of the device individual information for the field device. In an example, the system is configured to register the asset specification of the field device at the edge device.

In a second aspect, there is provided an industrial field device monitoring system, wherein the system comprises an edge device, and wherein the system is configured to: download an asset specification of a field device to the edge device, wherein the field device is located in an industrial environment, wherein the field device is configured to generate data relating to an asset of the industrial environment, wherein the edge device is located in the industrial environment, and wherein the edge device is configured to receive the data generated by the field device; receive an asset monitoring sub model for the field device, wherein the asset monitoring sub model specifies an interface specification and algorithm of an asset monitoring application for the field device; deploy the asset monitoring application for the field device to the edge device, wherein the deployment comprises utilization of the asset monitoring sub model; generate a workflow function exposed by the asset monitoring application, wherein the generation of the workflow function comprises utilization of the asset specification of the field device and the interface specification of the asset monitoring sub model; and invoke by the edge device the workflow function exposed by the asset monitoring application with the data received from the field device.

In an example, parts of the system other than the edge device can be operating in a cloud computing environment. In an example, parts of the system other than the edge device can be operating on one or more on-premise servers. In an example, parts of the system other than the edge device can be operating on one or more off-premise servers. In an example, the edge device can continuously invoke the workflow function exposed by the asset monitoring application with the data received from the field device.

In an example, the system is configured to register the asset monitoring sub model at the edge device. In an example, the system is configured to register the asset specification of the field device at the edge device. In an example, the asset specification of the field device comprises one or more asset specification sub models. The system is configured to generate a new asset specification sub model based on the information downloaded, deployed and/or registered to the edge device.

In a third aspect, there is provided an industrial field device monitoring method, comprising: downloading an asset specification of a field device to an edge device, wherein the field device is located in an industrial environment, wherein the field device is configured to generate data relating to an asset of the industrial environment, wherein the edge device is located in the industrial environment, and wherein the edge device is configured to receive the data generated by the field device; receiving an asset monitoring sub model for the field device, wherein the asset monitoring sub model specifies an interface specification and algorithm of an asset monitoring application for the field device; deploying the asset monitoring application for the field device to the edge device, wherein the deployment comprises utilizing the asset monitoring sub model; and generating a workflow function exposed by the asset monitoring application, wherein the generating the workflow function comprises utilizing the asset specification of the field device and the interface specification of the asset monitoring sub model.

In a fourth aspect, there is provided an industrial field device monitoring method, comprising: downloading an asset specification of a field device to an edge device, wherein the field device is located in an industrial environment, wherein the field device generates data relating to an asset of the industrial environment, wherein the edge device is located in the industrial environment, and wherein the edge device receives the data generated by the field device; receiving an asset monitoring sub model for the field device, wherein the asset monitoring sub model specifies an interface specification and algorithm of an asset monitoring application for the field device; deploying the asset monitoring application for the field device to the edge device, wherein the deployment comprises utilizing the asset monitoring sub model; generating a workflow function exposed by the asset monitoring application, wherein the generating the workflow function comprises utilizing the asset specification of the field device and the interface specification of the asset monitoring sub model; and invoking by the edge device the workflow function exposed by the asset monitoring application with the data received from the field device.

According to another aspect, there is provided a computer program element controlling one or more of the systems as previously described which, if the computer program element is executed by a processor, is adapted to perform the methods as previously described.

According to another aspect, there is provided a computer readable medium having stored a computer element as previously described.

The computer program element can for example be a software program but can also be a FPGA, a PLC or any other appropriate digital means.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising,"

"having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An industrial field device monitoring system, wherein the system is configured to:

download an asset specification of a field device to an edge device, wherein the field device is located in an industrial environment, wherein the field device is configured to generate data relating to an asset of the industrial environment, wherein the edge device is located in the industrial environment, and wherein the edge device is configured to receive the data generated by the field device;

receive an asset monitoring sub model for the field device, wherein the asset monitoring sub model specifies an interface specification and algorithm of an asset monitoring application for the field device, wherein the algorithm is a software-container and the interface specification is an invokable interface;

deploy the asset monitoring application for the field device to the edge device, wherein the deployment comprises utilization of the asset monitoring sub model by invoking, via a computation engine of the edge device, a workflow function exposed by the asset monitoring application with data streamed from device instances associated with the edge device;

generate the workflow function exposed by the asset monitoring application, wherein the generation of the workflow function comprises utilization of the asset specification of the field device and the interface specification of the asset monitoring sub model; and generate endpoints to access contents of the asset monitoring sub model, wherein the endpoints comprise endpoints from the deployed asset monitoring application.

2. The system according to claim 1, wherein the system is further configured to provide the asset monitoring sub model to a generator to generate a configuration file to register the asset monitoring application at the edge device.

3. The system according to claim 1, wherein the generation of the workflow function comprises utilization of the endpoints from the deployed asset monitoring application.

4. The system according to claim 1, wherein the system is further configured to register the asset monitoring sub model at the edge device.

5. The system according to claim 1, wherein the asset specification of the field device comprises device individual information for the field device, and wherein the generation of the workflow function comprises utilization of the device individual information for the field device.

6. The system according to claim 1, wherein the system is further configured to register the asset specification of the field device at the edge device.

7. An industrial field device monitoring system, wherein the system comprises an edge device, and wherein the system is configured to:

download an asset specification of a field device to the edge device, wherein the field device is located in an industrial environment, wherein the field device is configured to generate data relating to an asset of the industrial environment, wherein the edge device is located in the industrial environment, and wherein the edge device is configured to receive the data generated by the field device;

receive an asset monitoring sub model for the field device, wherein the asset monitoring sub model specifies an interface specification and algorithm of an asset monitoring application for the field device, wherein the algorithm is a software-container and the interface specification is an invokable interface;

deploy the asset monitoring application for the field device to the edge device, wherein the deployment comprises utilization of the asset monitoring sub model;

generate a workflow function exposed by the asset monitoring application, wherein the generation of the workflow function comprises utilization of the asset specification of the field device and the interface specification of the asset monitoring sub model;

invoke by a computation engine of the edge device the workflow function exposed by the asset monitoring application with data streamed from device instances associated with the field device; and generate endpoints to access contents of the asset monitoring sub model, wherein the endpoints comprise endpoints from the deployed asset monitoring application.

8. The system according to claim 7, wherein the system is further configured to register the asset monitoring sub model at the edge device.

9. The system according to claim 7, wherein the system is further configured to register the asset specification of the field device at the edge device.

10. The system according to claim 7, wherein the asset specification of the field device comprises one or more asset specification sub models, and wherein the system is configured to generate a new asset specification sub model based on the information downloaded, deployed and/or registered to the edge device.

11. An industrial field device monitoring method, comprising:

downloading an asset specification of a field device to an edge device, wherein the field device is located in an industrial environment, wherein the field device is configured to generate data relating to an asset of the industrial environment, wherein the edge device is located in the industrial environment, and wherein the edge device is configured to receive the data generated by the field device;

receiving an asset monitoring sub model for the field device, wherein the asset monitoring sub model specifies an interface specification and algorithm of an asset monitoring application for the field device, wherein the algorithm is a software-container and the interface specification is an invokable interface;

deploying the asset monitoring application for the field device to the edge device, wherein the deployment comprises utilizing the asset monitoring sub model by invoking, via a computation engine of the edge device, a workflow function exposed by the asset monitoring application with data streamed from device instances associated with the edge device;

generating the workflow function exposed by the asset monitoring application, wherein the generating the workflow function comprises utilizing the asset specification of the field device and the interface specification of the asset monitoring sub model; and generating endpoints to access contents of the asset monitoring sub model, wherein the endpoints comprise endpoints from the deployed asset monitoring application.

12. An industrial field device monitoring method, comprising:

downloading an asset specification of a field device to an edge device, wherein the field device is located in an industrial environment, wherein the field device generates data relating to an asset of the industrial environment, wherein the edge device is located in the industrial environment, and wherein the edge device receives the data generated by the field device;

receiving an asset monitoring sub model for the field device, wherein the asset monitoring sub model specifies an interface specification and algorithm of an asset monitoring application for the field device, wherein the algorithm is a software-container and the interface specification is an invokable interface;

deploying the asset monitoring application for the field device to the edge device, wherein the deployment comprises utilizing the asset monitoring sub model;

generating a workflow function exposed by the asset monitoring application, wherein the generating the workflow function comprises utilizing the asset specification of the field device and the interface specification of the asset monitoring sub model;

invoking by a computation engine the edge device the workflow function exposed by the asset monitoring application with data streamed from device instances associated with the field device; and generating endpoints to access contents of the asset monitoring sub model, wherein the endpoints comprise endpoints from the deployed asset monitoring application.

* * * * *